June 19, 1928.

C. CLAUS 1,674,623

STEERING MAST BUSHING

Filed May 20, 1927

INVENTOR
CARL CLAUS.
BY ATTORNEY

Patented June 19, 1928.

1,674,623

UNITED STATES PATENT OFFICE.

CARL CLAUS, OF PLAINFIELD, NEW JERSEY, ASSIGNOR TO BOUND BROOK OIL-LESS BEARING COMPANY, OF BOUNDBROOK, NEW JERSEY, A CORPORATION OF NEW JERSEY.

STEERING-MAST BUSHING.

Application filed May 20, 1927. Serial No. 192,936.

The invention relates to bushings for steering masts for motor vehicles and has particular reference to the bushing or bearing for the steering mast which rotates within the steering column, and has for its object the production of a construction which is easily applied, and will initially form and maintain a bearing which will avoid the necessity of manufacturing within close limits of fit.

A further object is to provide a construction that will hold these parts in continuous working fit through long use.

The foregoing and other features of my steering mast bushing will now be described in connection with the accompanying drawing in which I have illustrated my bushing construction in its preferred form, after which I shall point out in the claims those features which I believe to be new and of my own invention.

In the drawings—

Figure 1:
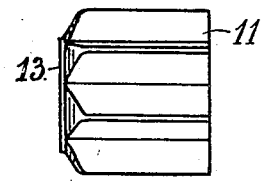
Figure 1 is a side view of my bushing construction.
Figure 2:
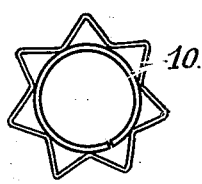
Figure 2 is an end view thereof looking from the right hand end of Figure 1.
Figure 3:
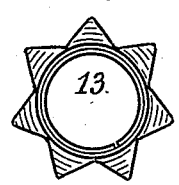
Figure 3 is an end view thereof looking from the left hand end of Figure 1.
Figure 4:
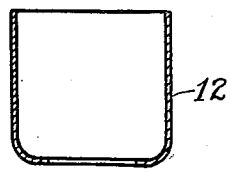
Figure 4 is a sectional view of the cup out of which my bushing may be formed.
Figure 5:
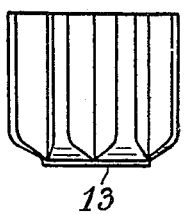
Figure 5 is a view showing the next operation after the cup shown in Figure 4 is formed.

In the manufacture of motor vehicle steering gears it is customary to pass a rotating steering mast through a stationary column and to support the mast therein by means of bushings which may be located at either end, and/or in the middle to prevent whip of the mast. For many years rubber blocks have been used to surround the bushing proper but have not been entirely satisfactory. My present bushing is made to overcome the objectional features to bushings of that nature. In the carrying out of my invention I employ a bushing 10 made of any of the well known bushing material comprising either a solid cylindrical bush or a split bushing. When the latter is used it is not necessary to work to as close dimensions as to the mast diameter as when the solid construction is used. The bushing 10 is provided with a container 11 which is drawn up by suitable dies into a cup 12 shown in Figure 4 and then formed into a star shaped piece as shown in Figure 5. The bottom 13 is blanked out and the bushing 10 is inserted. The star container may have any number of points so long as the exterior of the points are sized to substantially fit the inside of the tube 20 forming the steering column while the interior of the points make substantially line contacts with the exterior of the bushing 10 inserted therein. It will be apparent that with this construction any variation of diameters of the column 20 and mast 21 will be readily compensated for by the flexibility of the star shaped container.

Figure 6:
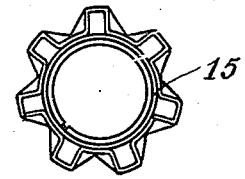
Figure 6 is an end view of my bushing construction similar to that shown in Figure 2 which shows substantially the form of the star container when drawn down to hold the bushing within the container.
Figure 7:
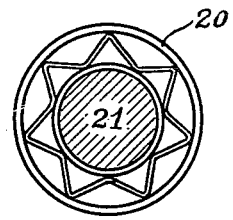
Figure 7 is an end view of my bushing construction in place in the steering column.
Figure 8:
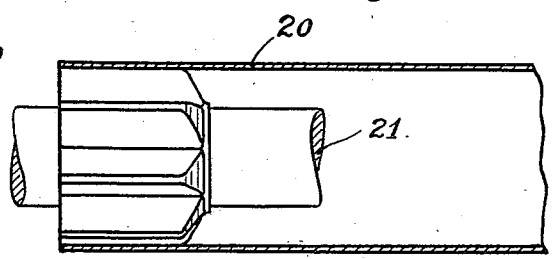
Figure 8 is a side view in part section showing my bushing construction within the column holding the steering mast in place.

Should it be found desirable or necessary to securely hold the bushing 10 within the star shaped container the end through which the bushing is passed when inserted may be formed down over the end of the bushing as shown in Figure 6.

Should it be desirable or necessary to insulate the bushing from the star shaped container I may use a cylindrical strip of paper or rubber 15 clearly shown in Figure 6.

With this construction the split bushing may expand sufficient to take care of any variation due to processes of manufacture in the diameter of the steering mast and the container will be resilient enough to give so that it can easily be forced into a tube of varying diameter within the limits of tolerance.

In the same manner the tension on the container will be exerted on the bushing to overcome any wear due to long use of the vehicle on which it is installed.

I wish it distinctly understood that my steering mast bushing construction herein illustrated and described is in the preferred form in which I desire to construct it but that changes or variations may be made as may be convenient or desirable without departing from the salient features of my invention and I therefore intend the following claims to cover such modifications as naturally fall within the lines of invention.

I claim—

1. A steering mast bushing construction in combination, a cylindrical bushing an outer covering therefor comprising a star shaped cup of sheet metal.

2. The device of claim 1 with the addition that the inner points of the star shaped cup make substantially line contacts with the bushing throughout their length.

3. A steering mast bushing construction comprising a cup shaped container for a bush, provided with an undulating cylindrical portion.

4. A steering mast bushing construction comprising a drawn cup shaped housing for the bush, provided with a meandry cylindrical portion.

5. A steering mast bushing comprising a split tubular member in combination with a star shaped cup container enclosing the tubular member.

6. A steering mast bushing in combination with a tubular bushing, a container comprising an annular end with a star shaped tubular extension the inner portion of the star shaped portion contacting with the outer circumference of the tubular bushing.

7. The device of claim 6 in which the container is made of a single piece of sheet metal.

8. The device of claim 6 in which the star shaped portion of the container is resilient and exerts a pressure on the bushing after the bushing is forced in place.

9. A method of making steering mast bushings which comprises the steps of drawing up a cup shaped member from a circular blank, forming the tubular portion of the cup into a star shaped container, pressing a tubular bushing into the star shaped container.

In witness whereof I affix my signature.

CARL CLAUS.